United States Patent
Miskolczy et al.

[15] 3,667,251
[45] June 6, 1972

[54] ABSORPTION REFRIGERATION SYSTEM

[72] Inventors: Gabor Miskolczy, Carlisle; Robert Kaiser, Cambridge, both of Mass.

[73] Assignee: Avco Corporation, Cincinnati, Ohio

[22] Filed: Nov. 9, 1970

[21] Appl. No.: 87,986

[52] U.S. Cl. ................................................62/476, 417/50
[51] Int. Cl. ........................................................F25b 15/00
[58] Field of Search................62/101, 102, 476; 137/251 A, 137/13; 417/50

[56] References Cited

UNITED STATES PATENTS

| | | |
|---|---|---|
| 2,131,782 | 10/1938 | Maiuri ..................................62/101 X |
| 2,667,764 | 2/1954 | Turner....................................62/101 |
| 2,802,344 | 8/1957 | Witherell................................62/101 |
| 3,407,625 | 10/1968 | McDonald..............................62/476 |

OTHER PUBLICATIONS

Rosenweig, " Theory of an Improved Thermomagnetic Generator," Proc. IEEE, Vol. 114, No. 3, March 1967.

Primary Examiner—William F. O'Dea
Assistant Examiner—P. D. Ferguson
Attorney—Charles M. Hogan and Abraham Ogman

[57] ABSTRACT

The invention is directed to an absorption-type refrigeration system in which a magneto-caloric pump system is used in combination with a compatible-ferrofluid refrigerant system to replace the percolator-type pump or other conventional pumps.

9 Claims, 1 Drawing Figure

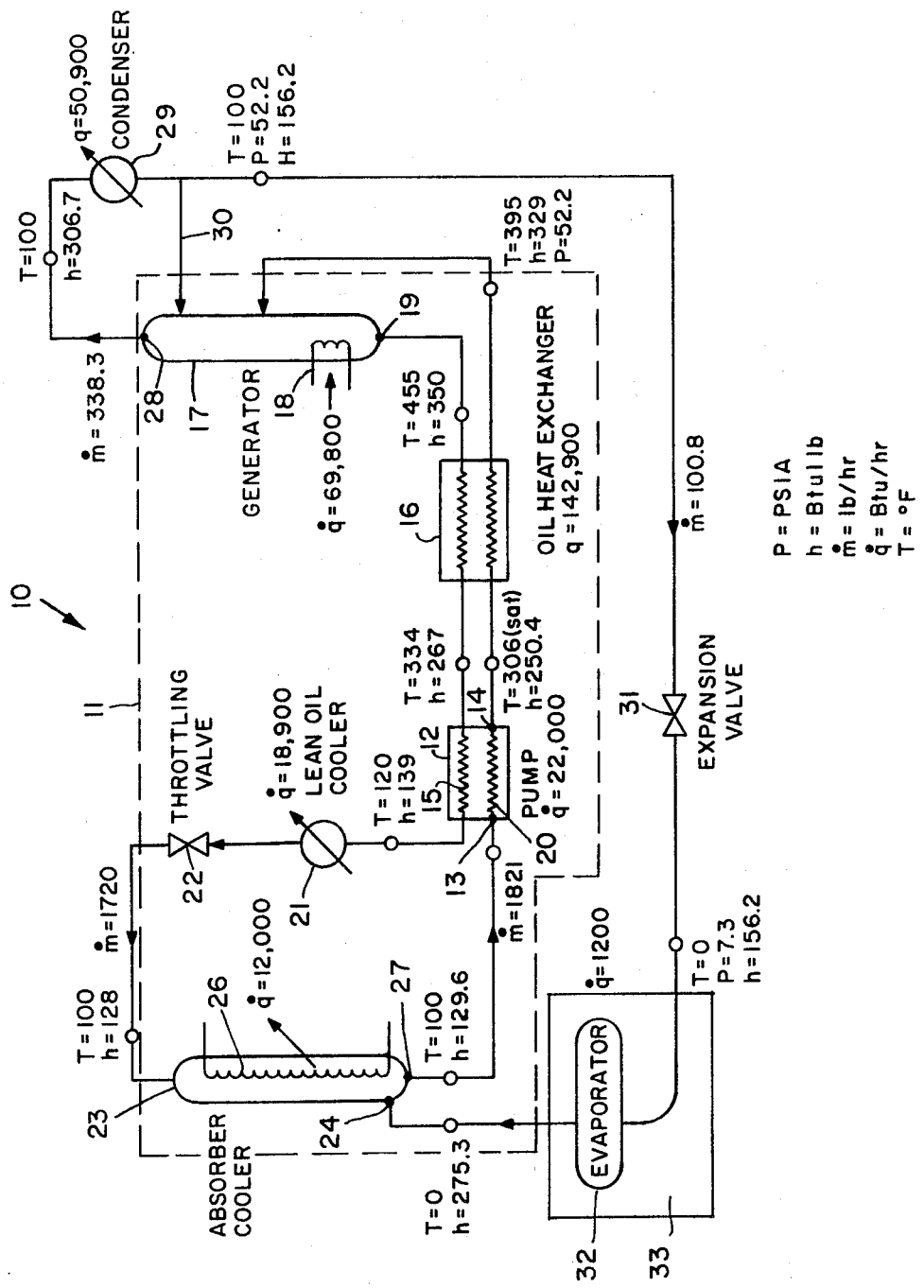

3,667,251

ABSORPTION REFRIGERATION SYSTEM

While this system is similar to conventional gas refrigerators, its significant difference is the use of magneto-caloric pump and the novel concept of using a compatible magnetic-fluid refrigerant system.

Like the gas refrigerator, the only external source of energy needed for operation is thermal energy.

It is an object of the invention to provide an absorption refrigeration system which avoids the limitations and disadvantages of other similar types of similar systems.

It is another object of the invention to provide an absorption refrigeration system having the significant advantage that cooling capacity is not limited.

It is yet another object of the invention to provide an absorption refrigeration system having a magneto-caloric pump and a compatible ferrofluid-refrigerant system.

It is a further object of the invention to provide an absorption refrigeration system where the only external energy required for operation is thermal energy; and It is another object of the invention to provide an absorption refrigeration system using thermal or magnetic pumping means for magnetic fluids.

In accordance with the invention, an absorption refrigeration system comprises a magneto-caloric pump system using a magnetic material containing a uniformly dispersed refrigerant. The system also includes means coupled to the pump for performing the following functions in sequence, separating the refrigerant from said magnetic material received from said pump, using said refrigerant to absorb heat, redistributing said heated refrigerant into magnetic material and supplying said magnetic material and said heated refrigerant to the input of said pump.

Also, in accordance with the invention, the preferred magnetic material is a ferrofluid.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing, in which:

The FIGURE is a schematic representation of an absorption refrigeration system embodying the principles of the invention. The schematic representation includes representative quantitative values for a butane-decane system.

MAGNETO-CALORIC PUMP SYSTEM

A magneto-caloric pump system is a device which moves magnetic substances from a region of low pressure to a region of high pressure. The complete operation and theory of such a process is described in an article entitled "Theory of an Improved Thermal Magnetic Generator" by R.E. Rosensweig—Proc. IEE, Vol. 114, No. 3, March, 1967, starting at page 405.

Briefly, however, the pump contains a magnetic field and a heat source. Under the influence of the magnetic field, magnetic fluid is drawn into the pump. As it proceeds along the pump, it is heated by the heat source until the temperature of the magnetic substance reaches a point where there is a significant reduction in the ferromagnetic properties of the material. Generally, this happens when the material's temperature approaches the so-called "Curie Point." The low temperature incoming material is attracted by the magnetic field contained in the pump. The heated material in the pump is no longer influenced by the magnetic field and is expelled from the pump by the incoming material. A pressure head in the conventional sense is thus created in the pump. The hot material from the pump is then utilized and returned to the pump input completing the pumping cycle. The manner in which the magneto-caloric pump is used in the absorption refrigerator will be described hereinafter.

FERROFLUIDS

Ferrofluids are colloidal dispersions of single domain ferromagnetic particles. These colloidal dispersions form a unique class of liquids in which it is possible to induce substantial magnetic forces that result in liquid motion. The magnetic response of a ferrofluid is due to the coupling of individual magnetic particles with a substantial volume of the surrounding carrier liquid. Thus, when a magnetic field is applied, while each particle experiences a force in the direction of the magnetic gradient, this force is also transmitted to the volume of the associated liquid phase.

Since most inorganic magnetic solids are characteristically insoluble in most common liquids and are not easily solvated, the coupling of a magnetic particle to the bulk liquid phase is accomplished by adding a stablizing chemical whose structure is such that it can both absorb on the surface of the particle and be solvated by the carrier liquid. This chemical can be either an ionic or molecular compound. This results in the formation of an essentially bound liquid sheath around each particle. By proper choice of stabilizing agent, magnetic properties can be conferred to a wide range of liquids including water, hydrocarbons, and fluorocarbons. Of particular interest to this invention are the magneto-caloric properties of ferrofluids, that is, their ability to convert thermal or magnetic energy directly into fluid motion without the use of moving mechanical parts. The magneto-caloric properties of the ferrofluid depend on the rate of change of magnetization of the magnetic solid used in its preparation with temperature, the absolute value being proportional to the amount of magnetic solids present.

ABSORPTION REFRIGERATOR

A basic consideration of the invention is to provide a refrigerant which is miscible, or uniformly distributable within the magnetic substance—in this case a ferrofluid—so it may be carried through the magneto-caloric pump with the ferrofluid. The refrigerant is separated from the ferrofluid in the pump outlet used in a conventional way to cool and is finally re-distributed with the ferrofluid and carried to the inlet of the magneto-caloric pump.

A detailed operation of the absorption refrigerant is best illustrated by referring to the Figure where the symbol 10 denotes an absorption refrigerator embodying the invention.

The components of the magneto-caloric pump system are depicted in the dotted outline 11. The magneto-caloric pump system 11 includes a pump 12 which receives at its input 13 a relatively cool ferrofluid having a refrigerant dissolved therein. The pump 12 includes, though not shown, a magnetic field which draws the ferrofluid-refrigerant composition into the pump 12. A source of heat 15 within the pump 12 heats the ferrofluid near its Curie temperature. The heated fluid is expelled at 14 by incoming cool ferrofluid as previously described. The heated ferrofluid passes through a heat exchanger 16 where it is further raised in temperature before passing into a generator 17.

The function of the generator 17 is to separate the refrigerant from the ferrofluid. This is accomplished by an external heat source 18. Heat is supplied until the temperature of the combination is raised above the vaporization temperature of the refrigerant. The still liquid ferrofluid passes out of the generator 17 at 19 through the heat exchanger 16 and the pump 12 into a cooler 21.

The ferrofluid from the generator 17, in passing through the heat exchanger 16 into pump 12 gives off some of its heat to the incoming ferrofluid-refrigerant combination, thus economizing on the amount of external heat that is supplied to the pump 12. The still hot ferrofluid, in passing through coil 15, heats the ferrofluid in coil 20 until the ferrofluid experiences a significant drop in magnetization.

The ferrofluid leaves the cooler 21, passes through a throttling valve 22, and into an absorber cooler 23. The ferrofluid in the absorber cooler 23 is mixed with refrigerant arriving at 24. The refrigerant goes into solution in the ferrofluid and the combination leaves the absorber cooler 23 at the exit 27 and passes into the input 13 of the pump 12. A heat exchanger 26 is also provided to remove heat from the combination ferrofluid-refrigerant.

Refrigeration is accomplished in a conventional way. The vaporized ferrofluid leaves the generator 17 at exit 28 and passes to the condenser 29 where it is liquified. A portion of the liquid refrigerant is coupled back to the condenser 29 via a reflux line 30 to improve efficiency. The remainder of the refrigerant from the condenser 29 passes through an expansion valve 31 of a conventional nature into an evaporator 32 located within the space 33. Heat is transferred from space 33 to the refrigerant in the evaporator 32 in a conventional way. The now heated refrigerant passes from the evaporator 32 into the absorber cooler 23 via input 24 where it is redissolved and redistributed within the ferrofluid as previously described.

The values of the numbers contained in the Figure of temperature ($T$), pressure ($P$), mass flow ($\dot{m}$), heat flow ($\dot{q}$), and heat content ($h$) were generated for a butane-decane system operating between 0° and 100° F where the butane is the refrigerant and the decane forms the ferrofluid carrier.

Suitable hydrocarbon materials for the carrier fluid are decane, octane, dodecane, mineral oil and kerosene. Butane, propane and ethane are compatible refrigerants.

Families of fluorocarbons are also adaptable for the described purposes. For example, the E9 and KRYTOX types of hexafluoropropylene oxide polymers marketed by DuPont and FC43 perfluorotributylamine marketed by 3M may be used as ferrofluid carriers.

The common hexafluoropropylene oxide polymers refrigerants known as Freon solvents, such as Freon E1, E2 and E3 are compatible with the aforementioned fluorocarbon carriers for use in the absorption refrigerator being discussed.

Water may be used as a refrigerant when used with certain fluorocarbons and hydrocarbons.

Preferably, the ferrofluid carrier and the refrigerant should have boiling points about 100° F apart. Obviously they must be compatible, meaning the refrigerant must be capable of being uniformly dispersed within the ferrofluid. Butane is miscible in decane so that dispersion is accomplished by means of a solution. In a Freon/water, Freon/hydrocarbon or hydrocarbon/water system a two phase dispersion results.

An important property of the suspensoids, the magnetic particles in suspension in the ferrofluids, is the Curie point. A significant reduction in the magnetic properties of the suspensoid must occur around the boiling point of the refrigerant for the appropriate pressure. Representative examples of such materials are manganese zinc, ferrite, chromium dioxide, chromium manganese antimonide. There are many others, particularly mixed ferrites.

A n-butane and n-octane system is another distinct possibility though one disadvantage is that the generator will require a larger area of contacting surfaces to achieve separation.

The absorption of a gas or vapor by a liquid is theoretically governed by Raoult's law. Since there are no ideal solutions, deviations from Raoult's law exist and are termed positive or negative.

A desirable combination should have a large negative deviation, as this requires a minimum amount of absorbent for the given refrigerant quantity needed to circulate in the system. While propane would be the preferred refrigerant in a conventional system, in a magneto-caloric system there is a much greater premium on low pump head, and butane is more attractive.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim
1. An absorption refrigeration system comprising:
a magneto-caloric pump utilizing a magnetic material having a uniformly dispersed refrigerant therein;
means coupled to the pump for receiving said magnetic material and refrigerant and for separating the refrigerant from said magnetic material;
means for condensing said refrigerant;
means for expanding said refrigerant for absorbing heat;
means for redistributing the heated refrigerant into the magnetic material; and
means for supplying said combined magnetic material and heated refrigerant to the input of said pump.

2. An absorption refrigeration system as defined in claim 1 where said magnetic material is a ferrofluid and said refrigerant is dissolved in said ferrofluid.

3. An absorption refrigeration system as defined in claim 1 where said magnetic material is a ferrofluid and said refrigerant is uniformly mixed with said ferrofluid.

4. An absorption refrigeration system as described in claim 3 where said refrigerant is water and said water is uniformly mixed with a hydrocarbon or fluorocarbon-based ferrofluid.

5. An absorption refrigeration system as defined in claim 1 where said ferrofluid, carrier fluid, and refrigerant are hydrocarbon based and miscible.

6. An absorption refrigeration system as defined in claim 5 where said ferrofluid carrier fluid is selected from the class consisting of decane, octane, dodecane, mineral oil and kerosene and said refrigerant is selected from the class consisting of butane, propane and ethane, said refrigerant having a boiling point below the boiling point of said carrier.

7. An absorption refrigeration system as defined in claim 5 where said ferrofluid carrier fluid is selected from the class of fluorocarbons consisting of hexafluoropropylene and perfluorotributylamine oils and said refrigerant is selected from the class of fluorocarbons consisting of hexafluoropropylene oxide polymers, said refrigerant having a boiling point below the boiling point of said carrier.

8. An absorption refrigeration system as defined in claim 1 where said ferrofluid and refrigerant are fluorocarbon based and miscible.

9. An absorption refrigeration system comprising:
a magneto-caloric pump using a ferrofluid and having a refrigerant dissolved in said ferrofluid;
means coupled to the outlet of said pump for separating said refrigerant from said ferrofluid and for recirculating said ferrofluid to said pump;
means coupled to said separating means for condensing the refrigerant;
means for expanding the condensed refrigerant and for transferring heat to said expanded refrigerant;and
means for redissolving the heated refrigerant in said recirculated ferrofluid and for supplying the combination to said pump.

* * * * *